United States Patent
Brown

(10) Patent No.: US 7,204,645 B2
(45) Date of Patent: Apr. 17, 2007

(54) APPARATUS AND METHOD FOR COUPLING LASER ENERGY INTO SMALL CORE FIBERS

(76) Inventor: Joe D. Brown, 8317 Front Beach Rd., Suite 21, Panama City Beach, FL (US) 32407

( * ) Notice: Subject to any disclaimer, the term of this patent is extended or adjusted under 35 U.S.C. 154(b) by 0 days.

(21) Appl. No.: 11/108,677

(22) Filed: Apr. 19, 2005

(65) Prior Publication Data

US 2005/0196108 A1    Sep. 8, 2005

Related U.S. Application Data

(62) Division of application No. 10/370,453, filed on Feb. 24, 2003.

(60) Provisional application No. 60/385,890, filed on Jun. 6, 2002, provisional application No. 60/358,309, filed on Feb. 22, 2002.

(51) Int. Cl.
*G02B 6/36* (2006.01)

(52) U.S. Cl. .............................. 385/88; 385/92; 385/31; 385/39; 385/43

(58) Field of Classification Search ................. 385/92, 385/88, 33, 31, 116, 140, 147; 606/17, 89, 606/16
See application file for complete search history.

(56) References Cited

U.S. PATENT DOCUMENTS

| | | | | |
|---|---|---|---|---|
| 3,912,362 | A | 10/1975 | Hudson | 350/96 |
| 4,060,308 | A * | 11/1977 | Barnoski et al. | 385/43 |
| 4,474,429 | A | 10/1984 | Yoldas et al. | 350/320 |
| 4,575,181 | A | 3/1986 | Ishikawa | 350/96.2 |
| 4,678,273 | A | 7/1987 | Vilhelmsson | 350/96.3 |
| 4,737,011 | A | 4/1988 | Iri et al. | 350/96.2 |
| 4,762,385 | A | 8/1988 | Fuse | 350/96.18 |
| 4,784,466 | A * | 11/1988 | Khoe et al. | 385/33 |
| 4,883,342 | A * | 11/1989 | Ishii et al. | 385/90 |
| 5,101,457 | A | 3/1992 | Blonder et al. | 385/33 |
| 5,132,079 | A | 7/1992 | Stewart et al. | 385/15 |
| 5,179,610 | A | 1/1993 | Milburn et al. | 385/92 |
| 5,243,681 | A | 9/1993 | Bowen et al. | 385/140 |
| 5,274,721 | A * | 12/1993 | Dickinson et al. | 385/31 |
| 5,291,570 | A | 3/1994 | Filgas et al. | 385/78 |
| 5,299,141 | A * | 3/1994 | Hungerford et al. | 702/49 |
| 5,490,227 | A | 2/1996 | Tanabe et al. | 385/29 |
| 5,619,602 | A | 4/1997 | Sandstrom et al. | 385/31 |
| 5,829,445 | A | 11/1998 | Martin et al. | 128/898 |
| 5,946,437 | A | 8/1999 | Uchida et al. | 385/77 |
| 6,154,596 | A | 11/2000 | Ionov | 385/128 |
| 6,167,177 | A | 12/2000 | Sandstrom et al. | 385/100 |
| 6,282,349 | B1 * | 8/2001 | Griffin | 385/81 |

(Continued)

FOREIGN PATENT DOCUMENTS

JP    02-134605    *    5/1990

*Primary Examiner*—Frank G. Font
*Assistant Examiner*—James P. Hughes
(74) *Attorney, Agent, or Firm*—Bacon & Thomas, PLLC

(57) ABSTRACT

A fiber optic connector for coupling focused radiant energy from a laser to a fiber optic conductor includes a secondary transmission path and one or more reflectors and/or heat sinks for deflecting errant radiant energy to a location where it be safely dissipated. In addition, coupling of the radiant energy to the cladding of the fiber is minimized by stripping or at least partially removing the cladding to reduce the amount of cladding in the area that extends to the focal plane of the radiant energy source.

3 Claims, 4 Drawing Sheets

U.S. PATENT DOCUMENTS

| | | | |
|---|---|---|---|
| 6,317,550 B2 | 11/2001 | Irie et al. | 385/123 |
| 6,332,721 B1 | 12/2001 | Inokuchi | 385/93 |
| 6,347,178 B1 | 2/2002 | Edwards et al. | 385/147 |
| 6,467,969 B1 * | 10/2002 | Shmulovich | 385/54 |
| 6,477,295 B1 | 11/2002 | Lang et al. | 385/31 |
| 6,488,414 B1 | 12/2002 | Dawes et al. | 385/79 |
| 6,595,698 B2 | 7/2003 | Gutierrez et al. | 385/85 |
| 6,597,835 B2 | 7/2003 | Jie et al. | 385/33 |
| 2002/0021870 A1 | 2/2002 | Engstrand et al. | 385/76 |
| 2003/0118283 A1 | 6/2003 | Healy | 385/33 |

\* cited by examiner

APPARATUS AND METHOD FOR COUPLING LASER ENERGY INTO SMALL CORE FIBERS

This application is a divisional of U.S. patent application Ser. No. 10/370,453, filed Feb. 24, 2003, which claims the benefit of provisional application Nos. 60/358,309, filed Feb. 22, 2002, and 60/385,890, filed Jun. 6, 2002.

BACKGROUND OF THE INVENTION

1. Field of the Invention

This invention generally relates to a method and apparatus for coupling radiant energy from a radiant energy source to the conducting medium of a primary optical system. The primary optical system may be, but is not necessarily limited to, an optical fiber system.

The invention also relates, in applications where the primary optical system is a fiber optic conductor, to a fiber optic connector for coupling focused radiant energy from a laser to a fiber optic conductor, and to a method of coupling radiant energy from the laser to the conductor, in which radiant energy that fails to couple with the conductor is directed away from sensitive structures, and preferably (though not necessarily) deflected back to the laser system itself, by means of a secondary transmission path and one or more reflectors and/or heat sinks, so that the errant radiant energy can be safely dissipated.

By directing excess radiant energy in this manner, the excess radiant energy is prevented from damaging the connector and optical components in the connector, thereby enabling the use of smaller fibers with greater coupling tolerances, and more specifically permitting the use of optical fibers having core diameters smaller than the focused spot of the laser source, that are not precisely aligned with the focused spot, and/or that have an acceptance angle too small to accept all of the focused radiant energy.

Finally, the invention also relates to a fiber optic termination, and to a method of terminating an optical fiber, that reduces or eliminates launching energy into the cladding of the fiber.

2. Description of Related Art

The invention provides a solution to the problem of errant radiant energy when coupling radiant energy from lasers or other coherent radiant energy sources, which are typically but not necessarily monochromatic, to relatively small primary optical transmission systems, for example, optical fibers used in medical devices such as scalpels or lithotripter fibers. Such optical fibers are especially useful to implement recently developed, minimally invasive surgical techniques.

An example of an apparatus to which the principles of the invention may be applied is illustrated in FIGS. 1 and 2. The apparatus includes a laser system 12 and a standard connector coupler 18 for coupling a connector such as connector 30 shown in FIG. 2, which couples the output of the laser system to a primary optical system such as an optical fiber or fiber cable 32. The laser may be a high energy pulse or continuous wave laser that generates a monochromatic radiant energy output beam 17. For example, the laser system may be a Holmium:YAG laser that generates an output formed of pulses on the order of 250μ seconds in pulse width and energy levels ranging up to 1800 mj/pulse with an average power of 12 Watts. The output beam 17 is passed through a condensing lens to form an output beam 17*a* that is focused on a spot 17*b* in the vicinity of input focal plane 16 and centered in a connector coupler 18 mounted on the laser enclosure 15 using respective X, Y, and Z adjustments 12*a*–12*c*. When connector 30 shown in FIG. 2 is secured to connector coupler 18 by locking member 40 (which may, for example, be an internally threaded nut), the connector ferrule 31 is ideally centered on focused spot 17*b* and the distal end of the connector ferrule is at the focal plane 16. In this example, the focused spot size at the focal plane 16 is on the order of 365 microns and the relative power density at the focal plane for a 365 micron spot with an average power of 12 watts is approximately 11.5 kW/cm$^2$. On the other hand, the power density 6 mm beyond the focal plane 16 is reduced by a factor of 50.

Ferrule 31 of connector 30 is typically a metal elongated hollow body member into which is inserted the optical fiber or fiber cable 32. The proximal end has a fiber clearance hole 38 drilled close to the outside diameter of the fiber 35. To secure the fiber 35 to the ferrule 31, a small portion of the fiber optic cable 32 is stripper away exposing the glass fiber 35. Before the stripped fiber is placed inside ferrule 31, an adhesive 34 may be applied to a small portion of exposed fiber 35 and the exposed fiber is passed through the internal diameter of the ferrule to its distal end. The extreme distal portion of the exposed fiber exits the ferrule through fiber clearance hole 38. Later, after adhesive 34 is cured, the exposed fiber 35 is trimmed and polished such that the distal end of the ferrule and the distal end of the fiber 35 are flush. Alternately, the fiber 35 may be secured within the ferrule by crimping a portion of the cable 32 to the ferrule using a sleeve.

The errant radiant energy problem arises when the primary optical transmission system approaches or is smaller than the size of the focused beam of radiant energy. For example, the smaller the diameter of an optical fiber, the more difficult it is to focus energy from the laser into the core. If the core diameter is smaller than that of the focused spot of the laser source, or if the focused radiant energy to the core is misaligned or greater than the fiber's acceptance angle, then energy will be transferred to structures that make up the coupler or that surround the core. The density is often great enough to soften, melt, or fuse any materials which are not highly optically transmissive or reflective. In many cases the energy density can be so great that photo thermal ablation may occur in the metal housing of the connector that couples the laser to the fiber, causing the metal to explosively form a plume mixture gases and micron size particles, which re-deposit and contaminate the focusing lens. Further lasing into the contamination can create extreme localized heating which ultimately destroys the focusing lens.

There is therefore a need for a coupling apparatus and method that minimizes the impact of radiant energy that fails to couple to the core of the optical fiber (or other primary optical transmission system).

Furthermore, the coupling apparatus and method must be compatible with existing laser systems and connectors, such as the one illustrated in FIG. 1. For example, in medical applications, connectors that implement the invention generally should be compatible with standard medical laser industry connectors, such as the SMA 905 standard connector.

Finally, even when all of the energy that fails to couple to the fiber is dissipated, a further problem arises in that some of the energy that couples to the fiber will couple to the cladding of the fiber rather than to the core, resulting in the problem that the cladding will act as a secondary wave guide and leak energy into surrounding coating during tight bends, such as my occur when the optical fiber is used for laser lithotripsy after it has been passed through the working channel of an endoscope. While the amount of coupling may be reduced by tapering, the core and cladding may mix, causing light to also mix into the cladding, and higher order modes may be created which are more subject to loss during a bend than lower order modes. By way of background, it was proposed in U.S. Pat. No. 6,282,349 to fuse the cladding to the ferrule in which it is placed, but the cladding fusion scheme described in this patent did not involve removal of some or all of the cladding at the end of the fiber reduce coupling of laser energy into the cladding.

There is therefore also a need for a laser-to-fiber coupling arrangement that reduces or eliminates coupling of focused radiant energy into the cladding of an optical fiber, rather than into the core.

SUMMARY OF THE INVENTION

It is accordingly a first objective of the invention to provide an apparatus and method for coupling a laser to an optical fiber or other primary optical transmission system, in which energy that does not couple to the primary optical transmission system is diverted to prevent damage to components of the coupling connector, and which therefore extends the useful life of the connector, ensures efficient coupling of a portion of the radiant energy to the transmission system, enables the use of smaller transmission components, for example fibers with smaller diameters and/or acceptance angles, and that accommodates greater tolerances in aligning the transmission system to the radiant energy source.

It is a second objective of the invention to provide an improved method of coupling a laser to an optical fiber in a way that facilitates use of relatively small optical fibers while minimizing damage to the coupling connector and components thereof, and yet that is compatible with standard laser coupling connectors, including medical laser industry standard metal connectors.

It is a third objective of the invention to provide an arrangement for coupling a laser to an optical fiber in a way that reduces or eliminates coupling to the cladding rather than the core.

These objectives are achieved, in accordance with the principles of a preferred embodiment of the invention, by a connector for coupling a radiant energy source to a primary optical transmission system in which the connector includes a housing that supports a proximal end of the transmission system, and in which the proximal end is surrounded by an optical window which maintains an elongated secondary radiant energy transmission air path that terminates in a single faceted reflector, the proximal end, secondary radiant energy transmission air path, and reflector all being aligned on a common axis.

The secondary radiant energy path is arranged such that radiant energy coupled to the proximal end is transmitted by the primary optical system while radiant energy that is not coupled to the proximal end or is lost therefrom is conducted along the secondary transmission path to the reflector and re-directed back through the secondary transmission path.

The re-directed energy is preferably diverted to a structure or location where it can be safely dissipated, such as the radiant energy source itself. For example, in an enclosed laser system, once the radiant energy travels outside the optical window and into the enclosed laser system, the radiant energy diverges so rapidly that the energy is low enough to eliminate the need for a heat sink.

In an especially preferred embodiment of the invention, the reflector may be a reflector member that includes a cylindrical body portion positioned in a cylindrical housing with an axial bore therethrough for the primary transmission system, with the reflector, window, and transmission paths being supported and enclosed in axial spaced apart relation to the cylindrical housing.

The reflector can be formed of metal such as copper, or can be made of a high temperature material such as ceramic with a deposited reflective surface or layer, the deposited surfaces being displaced from the output end of the secondary transmission path far enough to reduce the energy density of the radiant energy incident thereon to non-destructive levels.

Preferably, the connector has dimensions and accommodates a coupling nut or other mechanism that permits the connector to be used in place of a conventional connector of the type illustrated in FIG. 2, without the need to modify the apparatus in which it is to be used. For example, a preferred connector for use with the apparatus illustrated in FIG. 1 should be capable of coupling directly to coupling connector 18 of FIG. 1, in place of conventional connector 30, although it is of course within the scope of the invention to require an adapter.

Further, in order to achieve the objective of reducing or eliminating coupling to the cladding of the fiber, which is not solved by re-directing errant radiant energy, the invention provides for removal of a section of cladding and the terminus of the fiber.

The method of the invention involves the steps of transferring radiant energy from a focused source by directing a focused region of the source to a predetermined plane; conducting a portion of the focused radiant energy incident on the plane along a first path; conducting the remaining portion of the focused radiant energy incident on the plane along a second path; reversing the direction of the remaining portion at a predetermined location, and directing the remaining portion back toward the focused laser source.

DETAILED DESCRIPTION OF THE PREFERRED EMBODIMENTS

Figure 1:
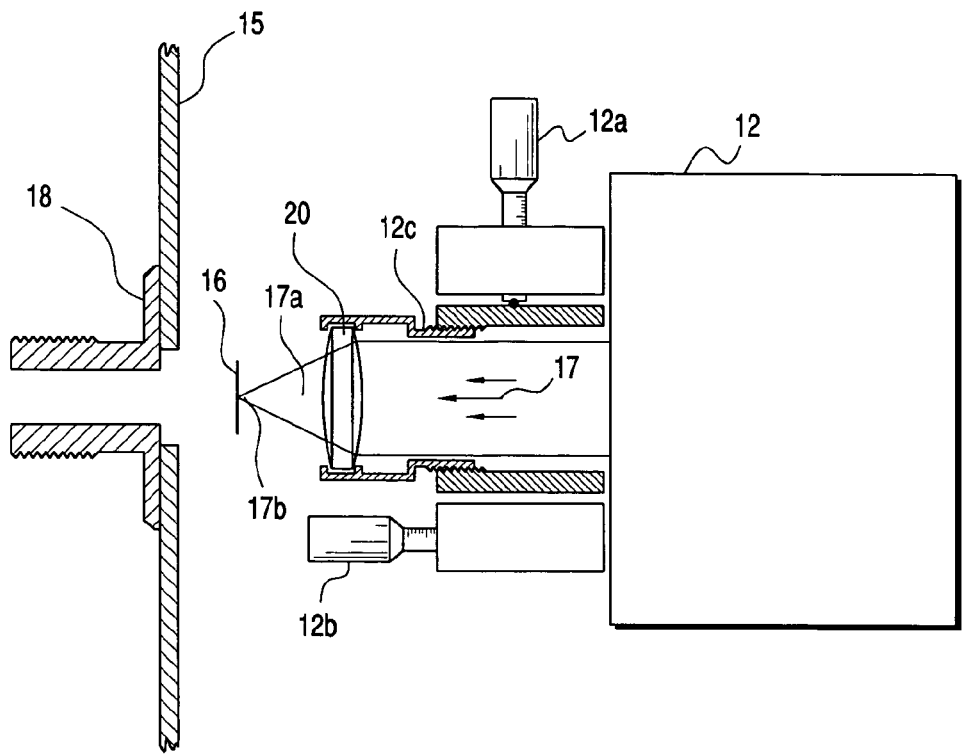
FIG. 1 is a plan view, partly in cross-section, showing a conventional radiant energy transmission system.
Figure 3:
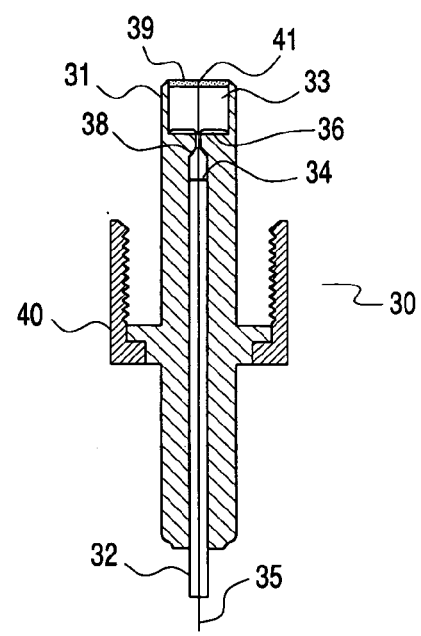
FIG. 3 is a cross-sectional view of a fiber optic connector constructed in accordance with the principles of a preferred embodiment of the invention.
Figure 4:
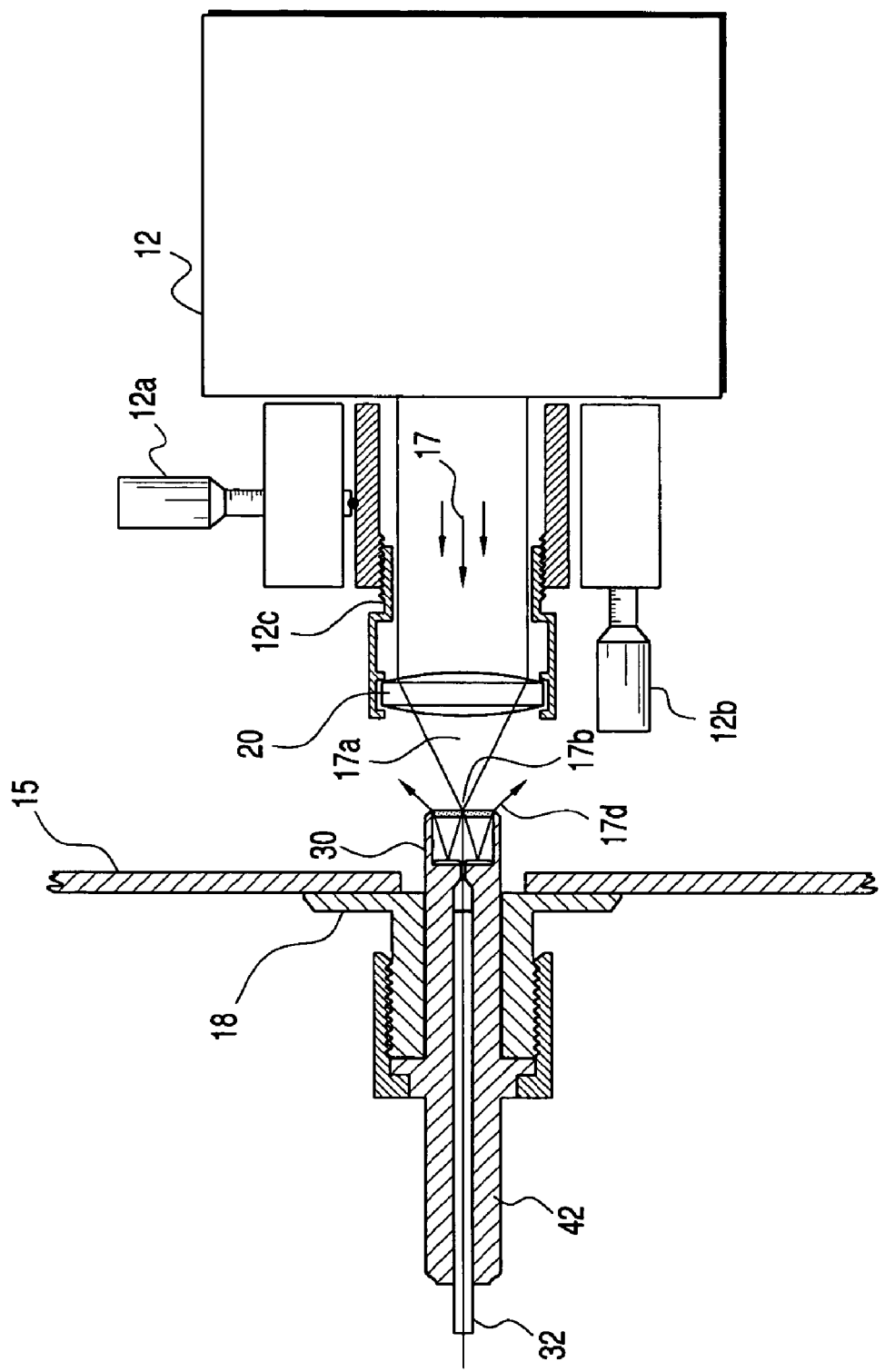
FIG. 4 is a plan view, partly in cross-section, showing a radiant energy transmission system that utilizes the connector of FIG. 3.

FIG. 3 illustrates a connector constructed in accordance with the principles of a preferred embodiment of the invention, for coupling to a coupling connector corresponding to coupling connector 18 illustrated in FIG. 1. FIG. 4 illustrates the operation of a connector of the type illustrated in FIG. 3 upon coupling to a conventional apparatus of the type illustrated in FIG. 1. It will of course be appreciated by those skilled in the art that the principles of the invention may be applied to laser apparatus other than the apparatus illustrated in FIGS. 1 and 4, and that the invention is not intended to be limited to a particular laser source or connector coupling arrangement.

Figure 2:
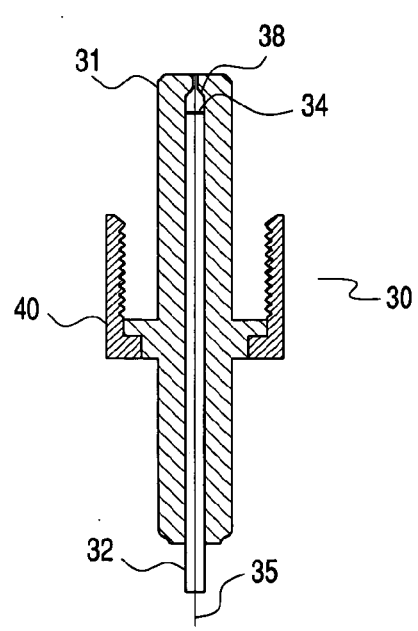
FIG. 2 is a cross-sectional view of a conventional fiber optic connector.

Turning to FIG. 3, connector 42 is identical in size to connector 30 of FIG. 2, but differs in that it further includes a single faceted-reflector 36, a secondary transmission path 33, and an optical window 39. The optical window 39 functions to ensure a clean surface on the reflector 36 and prevents a plume from contaminating the condensing lens 20 as a result of accidental thermal ablation of the connector's metal ferrule 31 or reflector 36, and may be formed of a variety of transmissive materials such as quartz, sapphire, or diamond. The window also has a fiber clearance hole 41 corresponding in size and position to the fiber clearance hole 38 shown in FIG. 2. However, after polishing of the fiber following insertion and adhesion or crimping of the fiber or fiber cable, both the distal end of the optical window 39 and the distal end of the optical fiber 35 are flush with the distal end of ferrule 31.

The reflector 36 is formed on a planar surface of the ferrule 31, surrounds the optical fiber, and is displaced far enough from the focal plane 16 to reduce the energy density of the radiant energy incident on the surface to non-destructive levels, with the secondary transmission path 33 extending from the reflector 36 back through the window 39 so as to provide a path where the focused radiant energy can freely defocus, thereby further lowering the energy density. The reflector functions to reflect radiant energy that may miss the proximal end of the fiber due to the fiber core being smaller than the focused spot, the NA of laser being greater than the NA of the fiber, and/or the due to misalignment of the focused radiant energy relative to the connector coupler 18. Suitable materials for the reflector 36 include metals such as copper, or a high temperature substrate such as ceramic on which is formed a reflective surface or layer.

Figure 5:
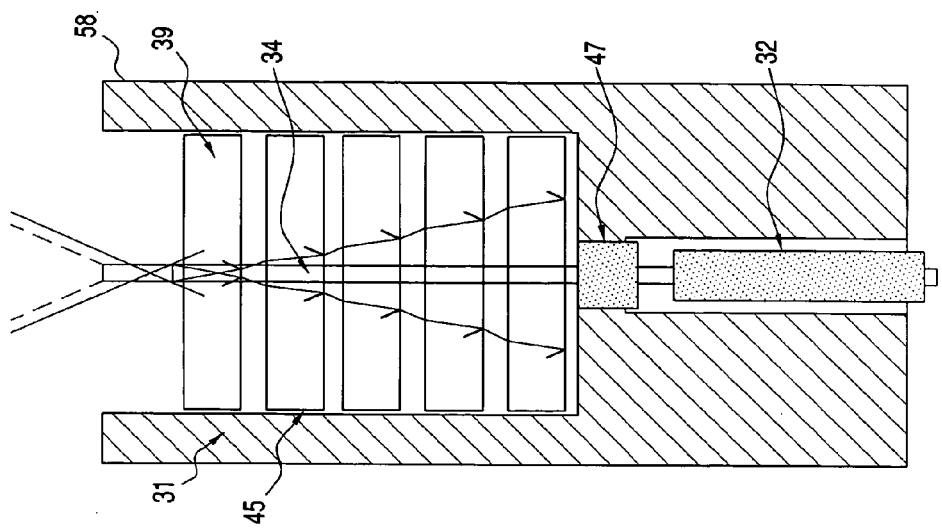
FIG. 5 is a cross-sectional view of a rear portion of the connector of FIG. 3, including a reflector and secondary optical transmission path.
Figure 6:
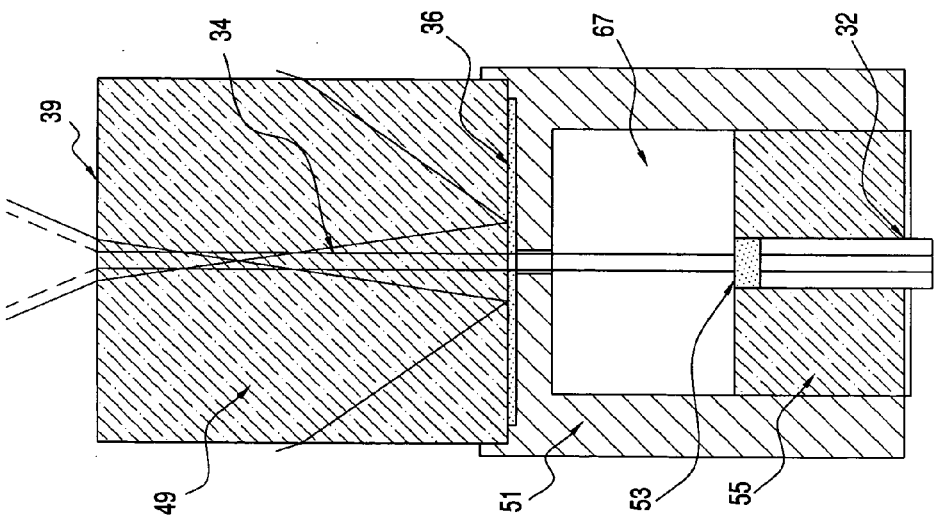
FIG. 6 is a cross-sectional view of an alternative rear portion of the connector of FIG. 3.
Figure 7:
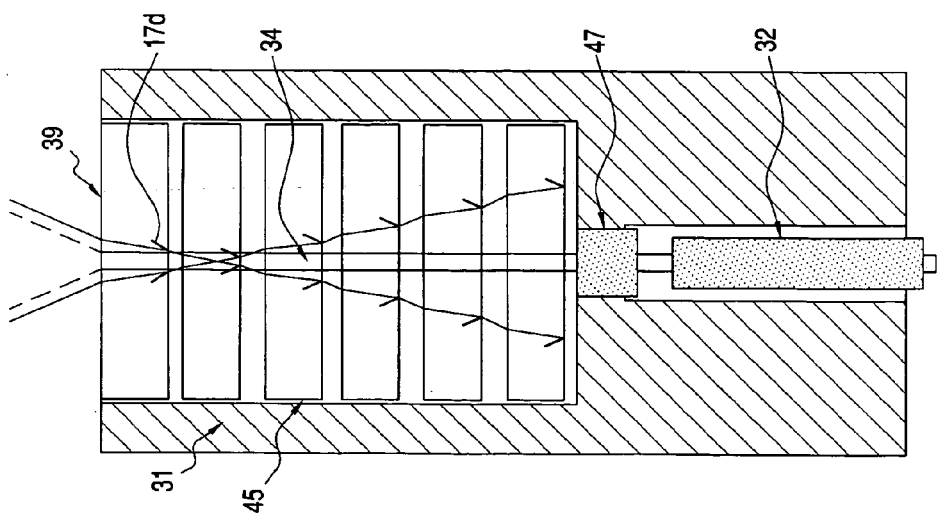
FIG. 7 is a cross-sectional view of a variation of the connector structure illustrated in FIG. 5.

As illustrated in FIG. 4, the radiant energy 17d not captured by the fiber core is simply reflected back into the laser system enclosure, where it can safely dissipate, as described above. Alternatively, as illustrated in FIGS. 5–7, the reflector may be replaced by a heat sink or a combination of both a reflector and a heat sink. For example, as illustrated in FIG. 5, the combination reflector and heat sink may include a series of optical transmitting windows 45, each of which reflects and absorbs part of the errant energy 17d, thereby permitting the invention to be used in applications where too much reflected light would otherwise travel into the laser and cause thermal damage or create oscillation problems in the lasing cavity. Because the energy absorbed by the attenuators could damage materials in the fiber optic cable 32, a sleeve 47 may be included to ensure that the cable materials are sufficiently isolated from the heat sink.

A still further alternative is to replace the metal ferrule with a light transmissive ferrule 49 made of quartz, sapphire, or other light transmissive materials with no surrounding metal, as illustrated in FIG. 6, which also shows a connector housing 51, and a quartz sleeve 55 to which cable 32 is attached by an adhesive, the quartz sleeve being isolated from ferrule 49 by an air space 57.

Finally, in a variation of the embodiment illustrated in FIG. 5, shown in FIG. 7, ferrule 31 may include a portion 58 that extends beyond the window 39, the window being recessed so as to expose the end of bare fiber 34 and permit errant energy to expand and reduce its power density to further minimize damage. In addition, recessing the window and exposing the fiber halps to keep the input surface free of debris. The optical window or attenuators may be treated, for example by roughening, so as to scatter or disperse incident errant radiant energy to further provide a reduction in power density.

As is apparent from the above-description and accompanying drawings, the method of the invention involves the steps of transferring radiant energy from a focused source by directing a focused region of the source to a predetermined plane; conducting a portion of the focused radiant energy incident on the plane along a first path; conducting the remaining portion of the focused radiant energy incident on the plane along a second path; reversing the direction of the remaining portion at a predetermined location, and directing the remaining portion back toward the focused laser source.

Figure 8:
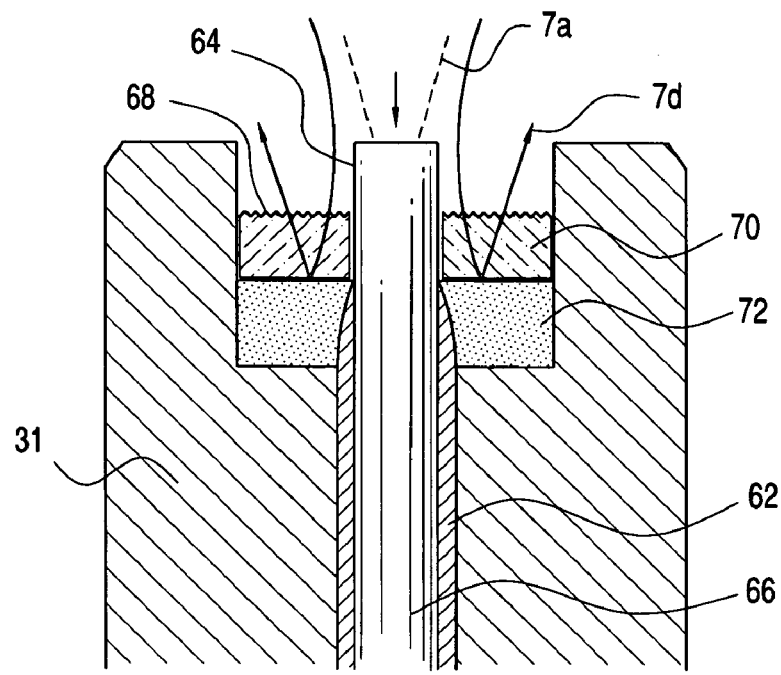
FIG. 8 is a cross-sectional view of an arrangement for reducing or eliminating coupling to the cladding of an optical fiber, which may be used separately or in connection with any of the other embodiments of the invention.

As illustrated in FIG. 8, in order to solve the further problem of coupling to the cladding of the fiber 34, the invention provides for complete or partial removal of a section of cladding 62 along a section 64 at the distal end of the core 66. This has the effect of setting the cladding back away from the focal plane of the laser light, or at least of reducing the amount of cladding that can couple with the laser. When combined with a window 70 with roughening 68 and a reflector/heat sink 72 as described above, coupling of focused radiant energy to the cladding 62 can be entirely eliminated.

Figure 9:
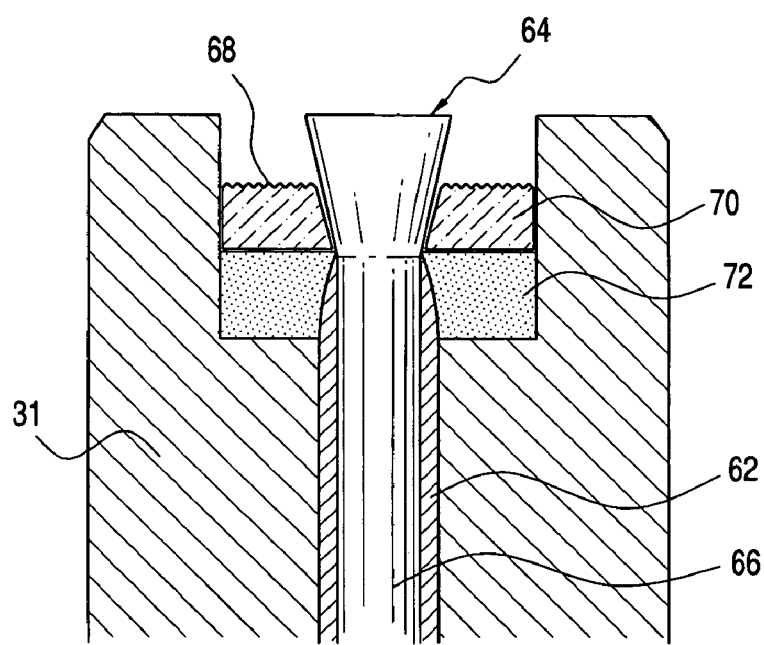
FIG. 9 is a cross-sectional view of a modification of the arrangement of FIG. 8.

In a variation of the cladding-coupling reduction or elimination arrangement illustrated in FIG. 8, as shown in FIG. 9, the exposed fiber core section 64' may be formed with an outward taper to enhance coupling to the core 66 rather than cladding 62.

Having thus described a preferred embodiment of the invention in sufficient detail to enable those skilled in the art to make and use the invention, it will nevertheless be appreciated that numerous variations and modifications of the illustrated embodiment may be made without departing from the spirit of the invention, and it is intended that the invention not be limited by the above description or accompanying drawings, but that it be defined solely in accordance with the appended claims.

I claim:

1. Apparatus for coupling focused radiant energy from a laser to an optical fiber having cladding, comprising:

energy dissipating means including a heat sink for dissipating energy that fails to couple to the fiber; and coupling minimizing means for reducing exposure of the cladding to the radiant energy, thereby minimizing coupling between the radiant energy and the cladding, wherein said coupling minimizing means includes a section of the optical fiber that has been partially stripped of cladding, wherein said partially-stripped section of the optical fiber is situated at a distal end of the optical fiber, and wherein said partially-stripped section is surrounded by the heat sink, and wherein the cladding of said partially stripped section is partially rather than completely removed.

2. Apparatus as claimed in claim 1, wherein a distal end of said core is tapered to increase an area exposed to said focused radiant energy.

3. Apparatus as claimed in claim 1, wherein said fiber is surrounded by a quartz sleeve.

* * * * *